(12) United States Patent
Zhou et al.

(10) Patent No.: US 12,279,298 B1
(45) Date of Patent: Apr. 15, 2025

(54) SERVICE-LEVEL COMMUNICATION AND COMPUTING COLLABORATIVE RESOURCE ALLOCATION DEVICE AND METHOD FOR LARGE-SCALE SATELLITE NETWORKS

(71) Applicant: Xidian University, Xi'an (CN)

(72) Inventors: Di Zhou, Xi'an (CN); Chenxi Bao, Xi'an (CN); Min Sheng, Xi'an (CN); Jiandong Li, Xi'an (CN); Yan Shi, Xi'an (CN); Weigang Bai, Xi'an (CN); Sijing Ji, Xi'an (CN); Yan Zhu, Xi'an (CN)

(73) Assignee: Xidian University, Xi'an (CN)

( * ) Notice: Subject to any disclaimer, the term of this patent is extended or adjusted under 35 U.S.C. 154(b) by 0 days.

(21) Appl. No.: 18/933,852

(22) Filed: Oct. 31, 2024

(30) Foreign Application Priority Data

Jul. 19, 2024 (CN) .......................... 202410970782.5

(51) Int. Cl.
*H04W 84/06* (2009.01)
*H04W 72/0446* (2023.01)
*H04W 72/566* (2023.01)

(52) U.S. Cl.
CPC ..... *H04W 72/566* (2023.01); *H04W 72/0446* (2013.01); *H04W 84/06* (2013.01)

(58) Field of Classification Search
CPC ........... H04W 72/566; H04W 72/0446; H04W 84/06
See application file for complete search history.

(56) References Cited

PUBLICATIONS

Zhongyu Miao et al., 'Research on Resource Allocation Algorithm for Satellite Uplink to Provide Differentiated QoS Support', IEEE Systems Journal, vol. 17, No. 1, Mar. 2023, pp. 1146-1157. (Year: 2023).*
CNIPA, Notification of First Office Action for CN202410970782.5, Aug. 21, 2024.
Xidian University (Applicant), Replacement claims (allowed) of CN202410970782.5, Aug. 22, 2024.
CNIPA, Notification to grant patent right for invention in CN202410970782.5, Sep. 23, 2024.

* cited by examiner

*Primary Examiner* — Melvin C Marcelo
(74) *Attorney, Agent, or Firm* — Hempisphere Law, PLLC; Zhigang Ma

(57) ABSTRACT

A service-level communication and computing collaborative resource allocation device and method for a large-scale satellite network are provided, the device includes: a network information management function module including a service request collection unit configured to collect service requests arriving at each satellite node in the network, and a network resource collection unit configured to collect available resource status information for each satellite node; a service preprocessing function module configured to preprocess service requests; a service feature extraction function module configured to perform feature extraction for preprocessed service requests to generate service demand features; a service order decision submodule configured to determine a service order of service requests; a service strategy decision submodule configured to output a service strategy of the service request. The device and method can effectively ensure that the large-scale satellite network provides high-performance services for service with service demands of communication and computing collaborative resources.

4 Claims, 4 Drawing Sheets ical Field

The disclosure relates to the field of satellite communication technologies, and more particularly to a service-level communication and computing collaborative resource allocation device and method for large-scale satellite networks.

SERVICE-LEVEL COMMUNICATION AND COMPUTING COLLABORATIVE RESOURCE ALLOCATION DEVICE AND METHOD FOR LARGE-SCALE SATELLITE NETWORKS

CROSS-REFERENCE TO RELATED APPLICATION

This application claims priority to Chinese Patent Application No. 202410970782.5, filed on Jul. 19, 2024, which is herein incorporated by reference in its entirety.

TECHNICAL FIELD

The disclosure relates to the field of satellite communication technologies, and more particularly to a service-level communication and computing collaborative resource allocation device and method for large-scale satellite networks.

BACKGROUND

Large-scale satellite networks (LSNs, including hundreds to tens of thousands of satellites), as an extension of terrestrial networks, are considered to be important infrastructure for providing on-demand high-performance services for future diversified services with their advantages of wide coverage and large capacity, and have become a hot spot in global science and technology and industrial development. However, with the continuous emergence of emerging services and significant increase in diversified service demands (such as a massive demand for communication resources for ultra-high data density services, and intensive requests for computing resources for Internet of Things intensive computing offloading services), efficiently collaborative communication and computing resources are essential to ensure the service performance of the LSNs. For example, the computing resources are used to compress the ultra-high data density services to improve the service performance of network communication resources, and the communication resources are used to transmit the Internet of Things intensive calculating offloading services to other satellite nodes in the LSNs for computing, thereby ensuring service timeliness of the services and improving the service performance of the computing resources of the entire network. Therefore, it is necessary to effectively collaborate communication and computing resources in LSNs to design a communication and computing collaborative resource allocation technology for the LSNs.

In the related art, a patent document of Beijing Jiaotong University (filed on Jul. 12, 2023, application NO. 202310851893.X, and application publication NO. CN116866353A) discloses a distributed resource collaborative scheduling method and device for fused communication and computing. The method constructs a distributed computing offloading communication model, a computing offloading computing model, and a distributed computing load balancing model. A distributed computing power scheduling algorithm is designed based on multi-agent deep deterministic policy gradient (MADDPG) to make decision about the computing power node that computing offloading tasks are offloaded, thereby achieving network load balancing and full utilization of resources. The designed device includes a communication and computing model acquirement module, a load balance model determination module, a process conversion module and a solution module, and the proposed method is implemented through information exchange between the above modules. However, the designed device only includes the communication and computing model computing modules after determining a service strategy of the service, without paying attention to the impact of a service order of the service request on overall service performance when batch services arrive, nor does it have a service analysis module. Besides, the designed device can only adapt to one type of service. Therefore, the designed device is difficult to effectively guarantee the service performance of the diversified services with massive demands for communication and computing resources.

Xiaoqiang Gao et al. (Xiaoqiang Gao et al, "Hierarchical Dynamic Resource Allocation for Computation Offloading in LEO Satellite Networks", IEEE Internet of Things Journal, February 2024) proposes a hierarchical dynamic resource allocation for computation offloading in low earth orbit (LEO) satellite networks. The method focuses on the LEO satellite as an edge computing node to provide computing services for users of the Internet of Things on the ground within its coverage, which is divided into two parts: computing offloading and resource allocation. Furthermore, the method introduces the breadth-first search to reduce solution complexity, which effectively reduces the service delay of the computing offloading service, and ensures the service performance of the service. However, the method allocates available resources in the network sequentially for a set of arriving service demands, without paying attention to the impact of the service order of the service demands. Moreover, although the method reduces the solution complexity through the breadth-first search, it is still related to the number of network service demands, the number of nodes in the network, and the number of links between the nodes, making it difficult to adapt to the LSNs with continuously expanding in the future. Therefore, the scalability of the method is poor.

In summary, it is urgent to provide a service-level communication and computing collaborative resource allocation device and method for LSNs, to improve the above problems in the related art.

SUMMARY

In order to solve the above problems in the related art, the disclosure provides a service-level communication and computing collaborative resource allocation device and method for LSNs. The technical problems to be solved in the disclosure are achieved by the following technical solutions.

In the first aspect, the disclosure provides a service-level communication and computing collaborative resource allocation method for LSN, including:

dividing a planning time of the LSN with resources to be allocated into T time slots;

analyzing a type of each of to-be-served service requests arriving at the LSN at the $t^{th}$ time slot of the T time slots to determine the type of each of the to-be-served service requests; and analyzing, according to the type of each to-be-served service request, attributes of each to-be-served service request to determine the attributes of each to-be-served service request;

calculating, according to the attributes of each to-be-served service request, edge attributes constructed for connecting the to-be-served service requests by using a service priority formula, to generate a service relationship graph corresponding to each type of the to-be-served service requests to thereby obtain service relationship graphs corresponding to the to-be-served service requests; and extracting, according to the service relationship graphs, a service demand feature of each to-be-served service request by using a trained service request representation network;

encoding, by using a service request encoder, the service demand feature of each to-be-served service request to generate a network service status of each to-be-served service request; obtaining, according to the network service status of each to-be-served service request, a decoding hidden status of each to-be-served service request by using a service request decoder, calculating, by using a service request served probability formula based on the decoding hidden status of each to-be-served service request, a probability of being served of each to-be-served service request, and determining, according to the probability of being served of each to-be-served service request, a service order of the to-be-served service requests; where the service request encoder and the service request decoder are constructed by long short-term memory networks;

calculating, by using a service communication and computing resource demand formula, a demand of each to-be-served service request for communication and computing resources according to the type and the attributes of each to-be-served service request, available resource status information of each satellite node of the LSN and the service order of the to-be-served service requests, to generate an available service mode set satisfying each to-be-served service request; and calculating, according to the available service mode set, a probability of being selected of each available service mode in the available service mode set of each to-be-served service request by using an Actor network, and selecting, according to the probability of being selected of each available service mode in the available service mode set of each to-be-served service request, a service strategy of each to-be-served service request;

obtaining a service strategy of each to-be-served service request arriving at the LSN at a $(t+1)^{th}$ time slot when each to-be-served service request arriving at the LSN at the $t^{th}$ time slot has selected a service strategy, or available resources in the LSN with resources to be allocated at the $t^{th}$ time slot are insufficient; and obtaining a service strategy of each to-be-served service request within the T time slots;

where the service request representation network, the service request encoder, the service request decoder and the Actor network are obtained through training in a reinforcement learning framework with a goal of maximizing a service request completion rate, and the service request representation network includes a graph convolutional network.

In the second aspect, the disclosure further provides a service-level communication and computing collaborative resource allocation device for LSN, including a network information management function module, a service preprocessing function module, a service feature extraction function module and a service-level resource allocation decision function module; the network information management function module includes a service request collection unit and a network resource collection unit, where the service request collection unit is configured to collect to-be-served service requests arriving at each satellite node in the LSN, and the network resource collection unit is configured to collect the available resource status information of each satellite node in the LSN.

An input interface of the service preprocessing function module is connected and communicated with an output interface of the service request collection unit, and the service preprocessing function module is configured to analyze the type of each to-be-served service request to determine the type of each to-be-served service request, and analyze, according to the type of each to-be-served service request, the attributes of each to-be-served service request to determine the attributes of each to-be-served service request.

An input interface of the service feature extraction function module is connected and communicated with an output interface of the service preprocessing function module, and the service feature extraction module is configured to calculate, according to the attributes of each to-be-served service request, edge attributes constructed for connecting the to-be-served service requests to generate the service relationship graph corresponding to each type of the to-be-served service requests to thereby obtain service relationship graphs corresponding to the to-be-served service requests, and extract, according to the service relationship graphs, the service demand feature of each to-be-served service request.

The service-level resource allocation decision function module includes a service order decision submodule and a service strategy decision submodule; an input interface of the service order decision submodule is respectively connected and communicated with an output interface of the service feature extraction function module and an output interface of the network resource collection unit, the service order decision submodule is configured to encode the service demand feature of each to-be-served service request to generate the network service status of each to-be-served service request, and calculate, according to the network service status of each to-be-served service request and the decoding hidden status of each to-be-served service request, the probability of being served of each to-be-served service request to determine the service order of the to-be-served service requests; an input interface of the service strategy decision submodule is connected and communicated with an output interface of the service order decision submodule, the output interface of the network resource collection unit, the output interface of the service preprocessing function module, the service strategy decision submodule is configured to calculate the demand of each to-be-served service request for communication and computing resources according to the type and the attributes of each to-be-served service request, the available resource status information of each satellite node of the LSN and the service order of the to-be-served service requests, to generate the available service mode set satisfying each to-be-served service request, calculate, according to the available service mode set, the probability of being selected of each available service mode in the available service mode set of each to-be-served service request, and output, according to the probability of being selected of each available service mode in the available service mode set of each to-be-served service request, the service strategy of each to-be-served service request.

The beneficial effects of the disclosure are as follows.

1. The disclosure provides a service-level communication and computing collaborative resource allocation device and method for LSNs. Compared with an existing resource allocation method, which provides services for service requests ignoring the impact of the service order on overall service performance, the disclosure designs a resource allocation device with a service order decision submodule. The service request encoder in the service encoding unit is used to encode each to-be-served service request and the available resources in the LSN, so that a relationship between the service requests in the LSN and a relationship between the service requests and the available resources in the LSN are clarified. The service request decoder in the service decoding unit is used to obtain the service order of the to-be-served service requests, thereby effectively ensuring the service performance of the LSNs for various service demands.

2. The disclosure provides a service-level communication and computing collaborative resource allocation device and method for LSNs. To solve the problem that the existing resource allocation methods have high solution complexity and poor scalability, and are difficult to adapt LSNs with continuously expanding network scales, the disclosure designs a service-level communication and computing collaborative resource allocation method based on a reinforcement learning framework. The allocation method, from a service perspective, utilizes the processing capability of the pointer network for sequential data and applies the deep reinforcement learning to select the service strategies for the service requests according to the service order, thereby achieving resource allocation that is independent of the network scale. The solution complexity of the designed allocation method is only related to the number of service requests, so as to effectively reduce the complexity of solving collaborative resource allocation strategies of the LSN, and improve the scalability of the method.

The disclosure is further described in detail below in conjunction with drawings and embodiments.

DETAILED DESCRIPTION OF EMBODIMENTS

The disclosure is further described in detail below in conjunction with embodiments, but the disclosure is not limited by this.

Aiming at disadvantages in the related art, the disclosure provides a service-level communication and computing collaborative resource allocation device and method for LSNs. A service order decision submodule with a service encoding unit and a service decoding unit is designed, so that a service order can be determined according to a service demand of each to-be-served service request, so as to improve the service performance of the LSNs for various service demands. A pointer network is introduced to reinforce the learning framework, so that services are provided for the service requests of the entire network from a service-level perspective, thereby avoiding the problem of increased solution complexity of collaborative resource allocation strategies of the LSN caused by the growth of the network scale. The allocation method have good scalability and can be applied to LSNs with expanding in the future.

Figure 1:
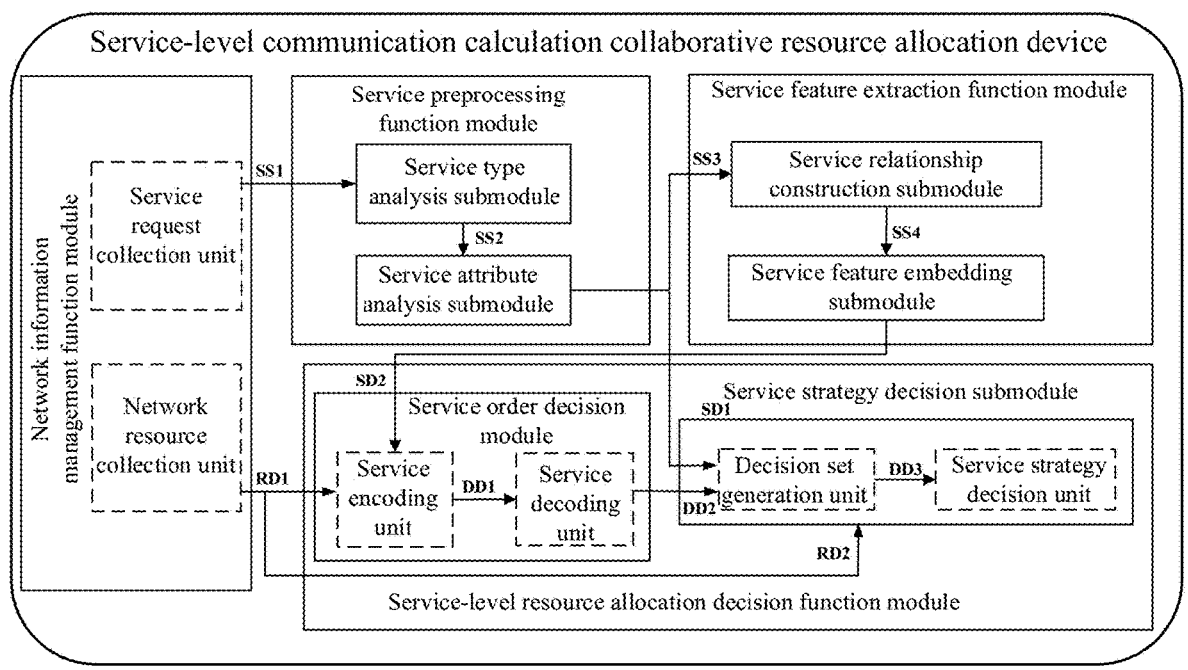
FIG. 1 illustrates a schematic diagram of a service-level communication and computing collaborative resource allocation device for a LSN according to an embodiment of the disclosure.

As shown in FIG. 1, FIG. 1 illustrates a schematic diagram of a service-level communication and computing collaborative resources allocation device for a LSN according to an embodiment of the disclosure. The service-level communication and computing collaborative resources allocation device for a LSN provided in the embodiments of the disclosure includes a network information management function module, a service preprocessing function module, a service feature extraction function module and a service-level resource allocation decision function module. The network information management function module includes a service request collection unit and a network resource collection unit. The service request collection unit is configured to collect to-be-served service requests arriving at each satellite node in the LSN. The network resource collection unit is configured to collect available resource status information of each satellite node of the LSN.

An input interface of the service preprocessing function module is connected and communicated with an output interface of the service request collection unit, and the service preprocessing function module is configured to preprocess the to-be-served service requests.

An input interface of the service feature extraction function module is connected and communicated with an output interface of the service preprocessing function module, and the service feature extraction function module is configured to perform feature extraction on the preprocessed to-be-served service requests to generate a service demand feature of each to-be-served service request.

The service-level resource allocation decision function module includes a service order decision submodule and a service strategy decision submodule. An input interface of the service order decision submodule is connected and communicated with an output interface of the service feature extraction function module and an output interface of the network resource collection unit. The service order decision submodule is configured to determine a service order of the to-be-served service requests according to the service demand feature of each to-be-served service request and available resource status information of each satellite node of the LSN. An input interface of the service strategy decision submodule is connected and communicated with an output interface of the service order decision submodule, the output interface of the network resource collection unit, the output interface of the service preprocessing function module. The service strategy decision submodule is configured to output a service strategy of each to-be-served service request according to the service order of the to-be-served service requests, the available resource status information of each satellite node of the LSN and each preprocessed to-be-served service request.

In an optional embodiment of the disclosure, the service preprocessing function module includes a service type analysis submodule and a service attribute analysis submodule.

An input interface of the service type analysis submodule is connected and communicated with the output interface of the service request collection unit. An output interface of the service type analysis submodule is connected and communicated with an input interface of the service attribute analysis submodule. An output interface of the service attribute analysis submodule is connected and communicated with the input interface of the service feature extraction function module and the input interface of the service strategy decision submodule. The service type analysis submodule is configured to analysis the type of each to-be-served service request to obtain the type of each to-beserved service request. The service attribute analysis submodule is configured to analyze, according to the type of each to-be-served service request, attributes of each to-be-served service request to obtain the attributes of each to-be-served service request.

In an optional embodiment of the disclosure, the service feature extraction function module includes a service relationship construction submodule and a service feature embedding submodule.

An input interface of the service relationship construction submodule is connected and communicated with the output interface of the service attribute analysis submodule. An output interface of the service relationship construction submodule is connected and communicated with an input interface of the service feature embedding submodule. An output interface of the service feature embedding submodule is connected and communicated with the input interface of the service order decision submodule. The service relationship construction submodule is configured to generate service relationship graphs according to the attributes of each to-be-served service request. The service feature embedding submodule is configured to extract a service demand feature of each to-be-served service request according to the service relationship graphs.

In an optional embodiment of the disclosure, the service order decision submodule includes a service encoding unit and a service decoding unit.

An input interface of the service encoding unit is connected and communicated with the output interface of the service feature embedding submodule. The input interface of the service encoding unit is further connected and communicated with the output interface of the network resource collection unit. An output interface of the service encoding unit is connected and communicated with an input interface of the service decoding unit. An output interface of the service decoding unit is connected and communicated with the input interface of the service strategy decision submodule. The service encoding unit is configured to encode each to-be-served service request according to the service demand feature of each to-be-served service request and the available resource status information of each satellite node of the LSN, to generate a network service status of each to-be-served service request. The service decoding unit is configured to calculate, according to the network service status of each to-be-served service request, a probability of being served of each to-be-served service request to determine the service order of the to-be-served service requests.

In an optional embodiment of the disclosure, the service strategy decision submodule includes a decision set generation unit and a service strategy decision unit.

An input interface of the decision set generation unit is connected and communicated with the output interface of the service relationship construction submodule. The input interface of the decision set generation unit is further connected and communicated with the output interface of the service decoding unit. An output interface of the decision set generation unit is connected and communicated with an input interface of the service strategy decision unit. The decision set generation unit is configured to generate an available service mode set satisfying each to-be-served service request according to the service order of the to-be-served service requests. The service strategy decision unit is configured to select a service strategy from the available service mode set for each to-be-served service request according to the service order of the to-be-served service requests.

Specifically, continuously referring to FIG. 1, the service-level communication and computing collaborative resource allocation device for the LSN includes the network information management function module, the service preprocessing function module, the service feature extraction function module and the service-level resource allocation decision function module. The network information management function module includes the service request collection unit and the network resource collection unit. The service preprocessing function module includes the service type analysis submodule and the service attribute analysis submodule. The service feature extraction function module includes the service relationship construction submodule and the service feature embedding submodule. The service-level resource allocation decision function module includes the service order decision submodule and the service strategy decision submodule. The service order decision submodule includes the service encoding unit and the service decoding unit. The service strategy decision submodule includes the decision set generation unit and the service strategy decision unit.

In an embodiment, each of the network information management function module, the service preprocessing function module, the service feature extraction function module, the service-level resource allocation decision function module, the service request collection unit, the network resource collection unit, the service type analysis submodule, the service attribute analysis submodule, the service relationship construction submodule, the service feature embedding submodule, the service order decision submodule, the service strategy decision submodule, the service encoding unit, the service decoding unit, the decision set generation unit and the service strategy decision unit is embodied by software stored in at least one memory and executable by at least one processor.

The service request collection unit is configured to collect to-be-served service requests arriving at each satellite node in the LSN, to construct a to-be-served service request sequence, and output the sequence to the service type analysis submodule by a SS1 interface. The SS1 interface is an information exchange interface between the service request collection unit and the service type analysis submodule.

The network resource collection unit is configured to collect the available resource status information of each satellite node of the LSN, output the available resource status information to the service encoding unit by a RD1 interface, and the decision set generation unit by a RD2 interface. The RD1 interface is an information exchange interface between the network resource collection unit and the service encoding unit, and the RD2 interface is an information exchange interface between the network resource collection unit and the decision set generation unit.

The service type analysis submodule is configured to analyze the type of each to-be-served service request, and output the analyzed result (i.e., the type of each to-be-served service request) to the service attribute analysis submodule by a SS2 interface. The SS2 interface is an information exchange interface between the service type analysis submodule and the service attribute analysis submodule.

The service attribute analysis submodule is configured to analyze, according to the type of each to-be-served service request, the attributes of each to-be-served service request in the to-be-served service request sequence to obtain the attributes of each to-be-served service request, output the obtaining result (i.e., the attributes of each to-be-served service request) to the service relationship construction submodule by a SS3 interface, and the decision set generation unit by a SD1 interface. The SS3 interface is an information exchange interface between the service attribute analysis unit and the service relationship construction submodule, and the SD1 interface is an information exchange interface between the service attribute analysis unit and the decision set generation unit.

The service relationship construction submodule is configured to construct the service relationship graph for each type of the to-be-served service requests, and output the constructed service relationship graphs to the service feature embedding submodule by a SS4 interface. The SS4 interface is an information exchange interface between the service relationship construction submodule and the service feature embedding submodule.

The service feature embedding submodule is configured to extract the service demand feature of each to-be-served service request according to the constructed service relationship graphs, and output the service demand feature of each to-be-served service request to the service encoding unit by a SD2 interface. The SD2 interface is an information exchange interface between the service feature embedding submodule and the service encoding unit.

The service encoding unit is configured to encode, according to the service demand feature of each to-be-served service request and the available resource status information of each satellite node of the LSN, each to-be-served service request to obtain the network service status of each to-be-served service request, and output the network service status to the service decoding unit by a DD1 interface. The DD1 interface is an information exchange interface between the service encoding unit and the service decoding unit.

The service decoding unit is configured to calculate the probability of being served of each to-be-served service request to determine the service order of the to-be-served service requests, and output the service order to the service strategy decision submodule by a DD2 interface. The DD2 interface is an information exchange interface between the service decoding unit and the service strategy decision submodule.

The decision set generation unit is configured to determine the available service mode set satisfying each to-be-served service request according to the service order of the to-be-served service requests, and output the available service mode set to the service strategy decision unit by a DD3 interface. The DD3 interface is an information exchange interface between the decision set generation unit and the service strategy decision unit.

The service strategy decision unit is configured to select a service strategy from the available service mode set for each to-be-served service request according to the service order of the to-be-served service requests.

Figure 2:
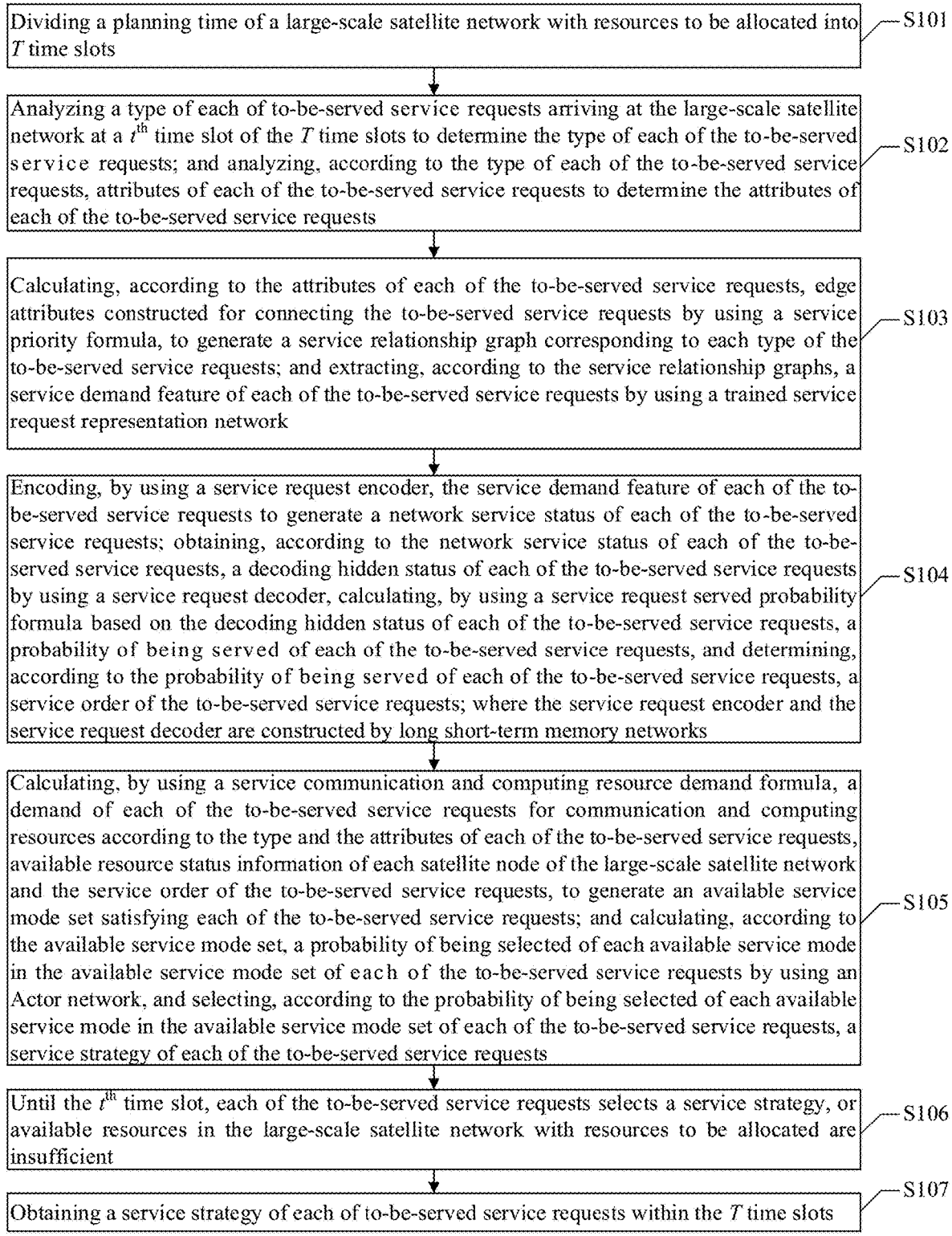
FIG. 2 illustrates a flowchart of a service-level communication and computing collaborative resource allocation method for the LSN according to an embodiment of the disclosure.

Based on the same inventive concept, as shown in FIG. 2, FIG. 2 illustrates a flowchart of a service-level communication and computing collaborative resource allocation method for the LSN according to an embodiment of the disclosure. The disclosure further provides a service-level communication and computing collaborative resource allocation method for the LSN, which is applied to the service-level communication and computing collaborative resource allocation device for the LSN provided in the above embodiment. Please refer to the above for the content of the device, which will not be repeated here.

The allocation method includes the following steps S101-S107.

In step S101, a planning time of the LSN with resources to be allocated is divided into T time slots.

In step S102, a type of each to-be-served service request arriving at the LSN at a $t^{th}$ time slot of the T time slots is analyzed to determine the type of each to-be-served service request. Attributes of each to-be-served service request is analyzed according to the type of each to-be-served service request to determine the attributes of each to-be-served service request.

In step S103, edge attributes constructed for connecting the to-be-served service requests are calculated according to the attributes of each to-be-served service request using a service priority formula, to generate a service relationship graph corresponding to each type of the to-be-served service requests to thereby obtain service relationship graphs corresponding to the to-be-served service requests. A service demand feature of each to-be-served service request is extracted according to the service relationship graphs using a trained service request representation network.

In step S104, the service demand feature of each to-be-served service request is encoded by using a service request encoder to generate a network service status of each to-be-served service request. A decoding hidden status of each to-be-served service request is obtained according to the network service status of each to-be-served service request using a service request decoder. A probability of being served of each to-be-served service request is calculated according to the decoding hidden status of each of the to-be-served service requests using a service request served probability formula. A service order of the to-be-served service requests is determined according to the probability of being served of each to-be-served service request. The service request encoder and the service request decoder are constructed by long short-term memory networks.

In step S105, a demand of each to-be-served service request for communication and computing resources is calculated according to the type and attributes of each to-be-served service request, an available resource status information of each satellite node of the LSN and the service order of the to-be-served service requests using a service communication and computing resource demand formula, to generate an available service mode set satisfying each to-be-served service request. A probability of being selected of each available service mode in the available service mode set of each to-be-served service request is calculated according to the available service mode set using an Actor network. A service strategy of to-be-served service request is selected according to the probability of being selected of each available service mode in the available service mode set of each to-be-served service request.

In step S106, a service strategy of each to-be-served service request arriving at the LSN at a $(t+1)^{th}$ time slot is obtained when each to-be-served service request arriving at the LSN at the $t^{th}$ time slot has selected a service strategy, or available resources in the LSN with resources to be allocated at the $t^{th}$ time slot are insufficient.

In step S107, a service strategy of each to-be-served service request within the T time slots is obtained.

Specifically, the embodiment is described in detail by the following processes steps S1-S8.

In step S1, the planning time of the LSN with resources to be allocated is divided into T time slots.

In step S2, all trained networks are loaded.

A trained service request representation network is loaded to the service feature embedding submodule, a trained pointer network consisting of the service request encoder and the service request decoder is respectively loaded to the service encoding unit and the service decoding unit, and a trained Actor network is loaded to the service strategy decision unit.

Specifically, the above networks are trained in a reinforcement learning framework with a goal of maximizing a completion rate of each to-be-served service request.

Training processes of all networks applied by the disclosure are further described as following steps S2.1-S2.8.

In step S2.1, training parameters of the service request representation network, the pointer network, the Actor network and a Critic network are initialized.

Specifically, the Critic network is configured to evaluate the service order and the service strategy selected by the pointer network and the Actor network, which is used in training only, and is used to make the network have higher service performance.

In step S2.2, a total number of training episodes K and a total number of planned time slots T of each training episode are initialized.

In step S2.3, for each training episode k, a service request sequence is cleared, and an initial resource status of each satellite node is set.

In step S2.4, the following steps S3-S6 are performed under the $t^{th}$ time slot, to determine a service request and a service strategy for this service. The service strategy is executed to obtain an immediate reward for serving the service request. The steps S3-S6 are performed under the next time slot until all service requests arrived at the current time slot are served, or the resources in the network in the current slot are insufficient for continuously providing service.

In step S2.5, the constructed service relationship diagrams, the obtained available resource status information for each satellite node, the selected service strategy for each service request, and the probability of the selected service strategy in steps S3-S6 are used as training experience data, and stored in an experience replay memory.

In step S2.6, whether the amount of the experience data stored in the experience replay memory reaches a number that can be used for network training is determined. When the amount of the experience data stored in the experience replay memory reaches the number that can be used for network training, a loss function of the Actor network is applied to update the training parameters of the service request representation network, the pointer network and the Actor network, and a loss function of the Critic network is applied to update the training parameters of the Critic network; otherwise, the step S2.7 is performed.

Specifically, the loss function of the Actor network can simultaneously update the training parameters of the service request representation network and the pointer network. The reason is that the output results of the service request representation network and the pointer network are the information required by the Actor network for selecting the service strategy, and the performance of the service request representation network and the pointer network are reflected by the advantages and disadvantages of the service strategies selected by the Actor network. Therefore, the loss function of the Actor network can be used to simultaneously update the training parameters of the service request representation network and the pointer network.

The loss function $L_{actor}$ of the Actor network is expressed as follows:

$$L_{actor} = \frac{1}{B}\sum_{b=1}^{B} \log(p_\theta(A_b^M|M_b)) \cdot (\text{reward}(A_b^M|M_b) - Q(M_b));$$

where B represents a number of training data sampled from the experience replay memory, log(·) represents a logarithm operation, θ represents the training parameters of the service request representation network, the pointer network and the Actor network, $p_\theta(A_b^M|M_b)$ represents a probability of a service request sequence $M_b=\{m|m=1, 2, \ldots, |M_b|\}$ in the $b^{th}$ training data adopting the service strategy sequence of service requests $A_b^M=\{a_1, \ldots, a_m \ldots, a_{|M_b|}\}$, $a_m$ represents a service strategy selected for the $m^{th}$ service request, $p_\theta(a_m|M_b)$ represents a probability of the $m^{th}$ service request in the service request sequence $M_b$ adopting the service strategy $a_m$, reward$(A_b^M|M_b)$ represents a reward of the service request sequence $M_b$ in the $b^{th}$ training data obtained by adopting the service strategy sequence of service requests $A_b^M$, reward$(a_m|M_b)$ represents a reward of the $m^{th}$ service request in the service request sequence $M_b$ obtained by adopting the service strategy $a_m$, and $Q(M_b)$ represents a baseline function that is independent of the adopted service strategy.

The loss function $L_{critic}$ of the Critic network is expressed as follows:

$$L_{critic} = \frac{1}{B}\sum_{b=1}^{B} \|Q_\varpi(M_b) - \text{reward}(A_b^M|M_b)\|_2^2;$$

where $\overline{\omega}$ represents the training parameters of the Critic network, $Q\overline{\omega}(M_b)$ represents a reward value predicted by the Critic network, and $\|\cdot\|_2$ represents a 2-norm operation.

In step S2.7, whether t<T is determined. When t<T, t=t+1, and the step S2.4 is performed; otherwise, the step S2.8 is performed.

In step S2.8, whether k<K is determined. When k<K, k=k+1, the step S2.3 is performed; otherwise, the training is completed, and the trained service request representation network, the trained the pointer network and the trained Actor network are obtained.

In step S3, the types and attributes of the service requests arriving at the LSN are analyzed. The step S3 specifically includes the following steps S3.1-S3.2.

In step S3.1, the service type analysis submodule analyzes the type of each service request based on the service request sequence provided by the service request collection unit by the SS1 interface to obtain the type of each service request.

The service request sequence is constructed by the service request collection unit collecting the to-be-served service requests arriving at each satellite node in the network at the $t^{th}$ time slot.

The types of service requests include all the service types that can be provided by the LSN at this stage.

In step S3.2, the service attribute analysis submodule analyzes the attributes of each service request based on the type of each service request provided by the service type analysis submodule by the SS2 interface to obtain the attributes of each service request.

The attributes of each service request include a service request type, a arrival rate of service requests, a data volume of service requests, a remaining service time of service requests, whether the service request needs data processing, a computing cycle required for per-bit data of the service request, the compression ratio of the service request data, a number and location information of the satellite node where the service request is currently located, a number and location information of a service request source node, a number and location information of a destination node of the service request and location information of a satellite node adjacent to the satellite node where the service request is currently located. Among them, the two attributes of the computing cycle required for per-bit data of the service requests and the compression ratio of the service request data only exist when the service request needs data processing.

It should be noted that in an actual application, there is a clear correlation between the service request types and the service request attributes. For example, for a large-capacity data transmission service, the service request attributes are large service request data volume and high tolerable delay of the service request, while for a remote machine communication service, the service request attributes are small service request data volume and low tolerable delay of the service request. Therefore, after knowing the service request types, the service request attributes can be analyzed according to the service request types.

In step S4, a service demand feature of each service request is extracted. The step S4 specifically includes the following steps S4.1-S4.2.

In step S4.1, the service relationship construction submodule determines a connection situation among the service requests and calculates, according to the part service request attributes provided by the service attribute analysis submodule, edge attributes constructed for connecting the service requests using the service priority formula, to further construct the service relationship graphs.

Specifically, the specific process for constructing the service relationship graphs by the service relationship construction submodule is further described below.

In step 1, whether the service requests in the network are connected is determined according to the index of satellite nodes to which the service requests arrive and the service request types. When the index of the satellite node and the service request type are the same, the two service requests are considered to be connected and an edge can be constructed. Otherwise, the two service requests are considered to be disconnected and an edge cannot be constructed. The constructed edge is bidirectional.

In step 2, the service priority of each service request is calculated according to the attributes of each service request using the service priority formula, and the service priority formula is expressed as follows:

$$P(m) = \Sigma_{f \in F} w_f(m) \cdot V_f(m),$$

where P(m) represents a service priority of the $m^{th}$ service request, F={f|f=1, 2, ..., |F|} represents an attribute set for computing the service priority of the service requests, |·| represents an operation for solving a number of elements in the attribute set, $w_f(m)$ represents a weight of the $f^{th}$ attribute of the $m^{th}$ service request, and of (m) represents a quantized value of the $f^{th}$ attribute of the $m^{th}$ service request.

The attribute set for computing the service priority of the service requests includes the data volume of service requests, the remaining service time of service requests and the distance between the satellite node where the service request is currently located and the destination satellite node.

Specifically, the distance between the satellite node where the service request is currently located and the destination satellite node can be calculated using the location information of the satellite node where the service request is currently located and the destination satellite node of the service request.

The weight $w_f(m)$ of the $f^{th}$ attribute of the $m^{th}$ service request is expressed as follows:

$$w_f(m) = \frac{\sum_{f \in F} I_{fy}(m)}{\sum_{x \in F} \sum_{y \in F} I_{xy}(m)},$$

where $I_{xy}(m)$ represents a score obtained by comparing importance of each attribute of the service request using a 0-1 scoring method to effectively evaluate the weight of each attribute of the service request, and $I_{xy}(m)$ is expressed as follows:

$$I_{xy}(m) = \begin{cases} 1 & x > y \\ 0.5 & x = y, \\ 0 & x < y \end{cases}$$

where x>y represents the importance of the $x^{th}$ attribute higher than the importance of the $y^{th}$ attribute, and the rest are similar.

A specific value of $v_f(m)$ is relative to the data volume of service requests, the remaining service time of service requests and the distance between the satellite node where the service request is currently located and the destination satellite node.

In the attribute set, a quantized value $v_1(m)$ of the first attribute, i.e., data volume of service requests, is expressed as follows:

$$v_1(m) = \frac{\text{data}(m)}{\text{data}_{max}},$$

where data(m) represents the data volume of the $m^{th}$ service request, and data$_{max}$ represents a maximum value of the data volume of service requests.

In the attribute set, a quantized value $v_2(m)$ of a remaining service time of the second attribute, i.e., remaining service time of service requests, is expressed as follows:

$$v_2(m) = \frac{\text{remain\_time}(m)}{\text{service\_delay}(m)},$$

where remain_time(m) represents the remaining service time of the $m^{th}$ service request, and service_delay(m) represents an allowable service delay of the $m^{th}$ service request. When the remaining service time of service requests is 0, this service request is deleted, i.e., the service is failed.

In the attribute set, a quantized value $v_3(m)$ of the third request attribute, i.e., the distance between the satellite node where the service request is currently located and the destination satellite node, is expressed as follows:

$$v_3(m) = \frac{d(m, cn, dn)}{d(m, sn, dn)},$$

where d(m, cn, dn) represents a distance between a satellite node cn where the $m^{th}$ service request is currently located and a destination satellite node dn of the $m^{th}$ service request, and d(m, sn, dn) represents a distance between a source satellite node sn of the $m^{th}$ service request and the destination satellite node dn of the $m^{th}$ service request.

In step 3, the service priority formula is used to calculate the weight of the bidirectional edge in each direction of any two interconnected service requests, and the weight is the edge attribute. The service priority formula is expressed as follows:

$$P_r(m, n) = \frac{P(n)}{P(m)},$$

where $P_r(m, n)$ represents a service priority of the $m^{th}$ service request relative to a $n^{th}$ service request, i.e., an edge attribute in a direction from the initial node being the service request m to the terminal node being the service request n, P(n) represents a service priority of the $n^{th}$ service request. Similarly, a service priority $P_r(n, m)$ of the $n^{th}$ service request relative to the $m^{th}$ service request (i.e., an edge attribute in a direction from the initial node being the service request n to the terminal node being the service request m) can be obtained by the above service priority formula.

It should be noted that, since the service request may go through multiple hops during transmission from the source satellite node to the destination satellite node and each hop of the service request transmission costs time, specific values of data(m), remain_time(m) and d(m, cn, dn) may change during the service request transmission process, to thereby change P(m).

In step 4, the service relationship graphs using the service requests as nodes, a part of attributes of the service requests as attributes of the nodes, connected service requests as edges, and the edge weights as the edge attributes are constructed.

The attributes of the nodes include the data volume of service requests, the remaining service time of service requests, whether the service request needs data processing, the location information of the satellite node where the service request is currently located, and the distance between adjacent satellite nodes of the satellite node where the service request is located and the destination satellite node. Specifically, the distance is calculated using the location information of adjacent satellite nodes of the satellite node where the service request is located and the location information of the destination satellite node.

In step S4.2, the service feature embedding submodule extracts the service demand feature of each service request based on the service relationship graphs provided by the service relationship construction submodule by the SS4 interface and by using the service request representation network consisting of the graph convolutional network.

In step S5, the service request is selected. The step S5 includes the following steps S5.1-S5.2.

In step S5.1, the service encoding unit constructs a service feature sequence of the service requests based on the service demand feature provided by the service feature embedding submodule by the SD2 interface and the available resource status information for each satellite node provided by the network resource collection unit by the RD1 interface, and encodes the service feature sequence by using the service request encoder constructed by the long short-term memory networks to obtain the network service status of each service request.

In step S5.2, the service decoding unit calculates the probability of being served of each service request based on the network service status provided by the service encoding unit by the DD1 interface, the decoding hidden status obtained by the service request decoder constructed by the long short-term memory networks and using the service request served probability formula, and selects the service request for according to the probability.

Figure 3:
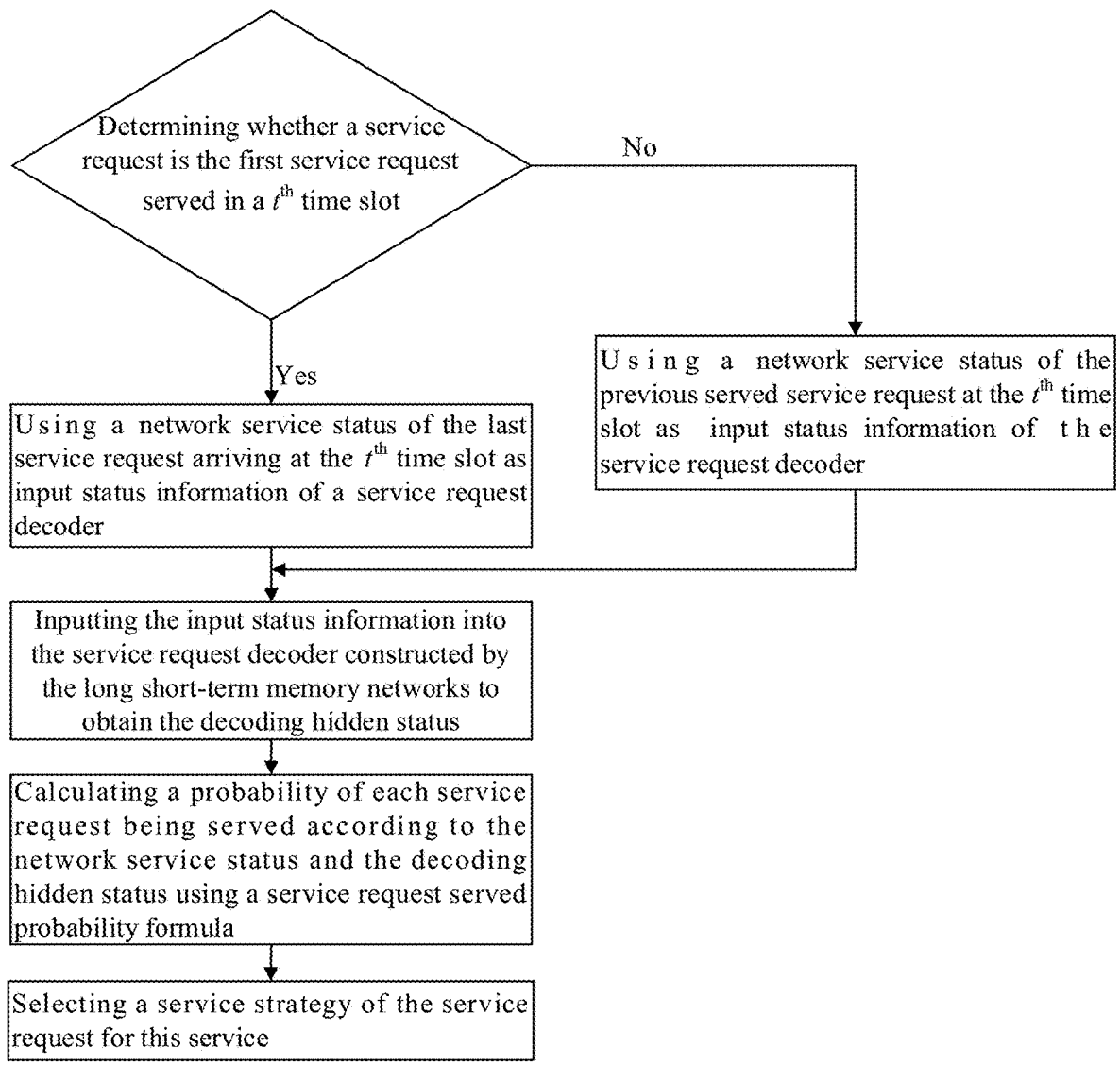
FIG. 3 illustrates a flowchart of determining an available service mode set according to an embodiment of the disclosure.

As shown in FIG. 3, FIG. 3 illustrates a flowchart of determining an available service mode set according to an embodiment of the disclosure. A specific process of the service decoding unit selecting the service request is further described as follows.

In step 1, whether the service request is the first service request served in the $t^{th}$ time slot is determined. When the service request is the first service request, the network service status of the last service request arriving at the LSN at the $t^{th}$ time slot is used as the input status information of the service request decoder; otherwise, the network service status of the previous served service request at the $t^{th}$ time slot is used as the input status information of the service request decoder.

In step 2, the input status information is input into the service request decoder constructed by the long short-term memory networks to obtain the decoding hidden status.

In step 3, the probability of being served of each service request is calculated according to the network service status and the decoding hidden status using the following service request served probability formula. The service request served probability formula is expressed as follows:

$$p(M^t) = \text{softmax}(U^i);$$

$$U^i = \{U_j^i | j=1,2, \ldots, |M^t|\};$$

$$U_j^i = V^T * \tanh(W_e * N_j + W_d * H_i) - SR_j^i, j \in \{1,2, \ldots, |M^t|\};$$

where $p(M^t)$ represents a probability of being served of each service request in a service request sequence $M^t = \{m | m=1, 2, \ldots, |M^t|\}$ in the $t^{th}$ time slot, softmax(·) represents a normalized exponential function, $U^i$ represents an input value of each service request in the normalized exponential function softmax(·) during the $i^{th}$ service, $U_j^i$ represents an input value of the $j^{th}$ service request in the normalized exponential function softmax(·) during the $i^{th}$ service, tanh(·) represents a hyperbolic tangent function, $N_j$ represents a network service status of the $j^{th}$ service request, $H_i$ represents a decoding hidden status for calculating the $i^{th}$ service request, V, $W_e$ and $W_d$ are both weight parameters, $SR_j^i$ represents whether the $j^{th}$ service request is served during the $i^{th}$ service, * represents a matrix multiplication operation, and T represents a matrix transpose operation.

During the $i^{th}$ service, when the $j^{th}$ service request is not served, $SR_j^i$ is set as 0; otherwise, $SR_j^i$ is set as a value much greater than a computing result of the first term of the equation $V^T * \tanh(W_e * N_j + W_d * H_i)$, so that the probability of the $j^{th}$ service request being served during the $i^{th}$ service approaches 0 and the $j^{th}$ service request will not be selected for service.

In step 4, the service request for this service is selected according to the probability of each service request being served.

In step S6, the service strategy of the service request for this service is selected. The step 6 specifically includes the following steps S6.1-S6.2.

In step S6.1, the decision set generation unit calculates the demand of communication and computing resources of the service request based on the service request information of this service provided by the service decoding unit by the DD2 interface, the part service request attributes provided by the service attribute analysis submodule by the SD1 interface, and available resource status information for each satellite node provided by the network resource collection unit by the RD2 interface and using the service communication and computing resource demand formula, and removes service modes that cannot satisfy the demand from the service mode set according to the computing result, to obtain the available service mode set of the service request.

The service communication and computing resource demand formula is expressed as follows:

$$C_{req}(m)=C_{pc} \cdot \text{data}(m) \cdot \chi(m);$$

$$R_{req}(m)=(1-\chi(m)) \cdot \text{data}(m)+\chi(m) \cdot C_{ratio} \cdot \text{data}(m);$$

where $C_{req}(m)$ represents a demand of computing resources for the $m^{th}$ service request, $C_{pc}$ represents a computing cycle required for per-bit data, data(m) represents a data volume of the $m^{th}$ service request, $\chi(m)$ represents whether data process is required to be performed on the $m^{th}$ service request, $R_{req}(m)$ represents a demand of communication resources for the $m^{th}$ service request, and $C_{ratio}$ represents a data compression ratio of the service request.

It should be noted that, since the service request may go through multiple hops during transmission from the source satellite node to the destination satellite node and data processing may be performed at one of the satellite nodes passed through, specific values of data(m) and $\chi(m)$ may change during the service request transmission process.

The available service mode set includes communication links between adjacent satellite nodes that can be directly used by the service request of this service at the current satellite node or can be used after compression processing of the computing resources of the current satellite node.

In step S6.2, the service strategy decision unit calculates the probability of each available service mode of the service requests being selected based on the available service mode set of the service requests of this service provided by the decision set generation unit by the DD3 interface and using the Actor network including a fully connected layer, and selects the service strategy of the service request according to the probability. The service strategy is executed to provide service for the selected service request.

In step S7, the steps S5-S6 are performed in a loop until all service requests arriving at the LSN at the $t^{th}$ time slot are served, or the resources in the network are insufficient for continuously providing services.

In step S8, the steps S3-S7 are performed in a loop until services of T time slots are completed.

In an optional embodiment of the disclosure, the effect of the disclosure is further described below in conjunction with a simulation experiment.

1. Simulation Experiment Conditions

A platform of the simulation experiment of the disclosure is Windows® 10 operating system and Python® 3.8.

In the simulation experiment of the disclosure, two satellite network scenarios respectively including 66 satellites and 1584 satellites are set, the available communication resource for each satellite to transmit the to-be-served service request to its adjacent satellite are 200 megabits per second (Mbits/s), the available computing resources for each satellite to transmit the to-be-served service request to its adjacent satellite are 2 gigacycles per second (Gcycles/s), and each satellite can receive the service requests and provide transmission services. The time interval for the arrival of the service requests obeys an exponential distribution with a mean of 2 seconds (s), and a delay demand of the service requests obeys a uniform distribution of [5,15]s, and a data size of each service request obeys a uniform distribution of [20,100] Mbits.

2. Simulation Contents and Result Analysis

Figure 4:
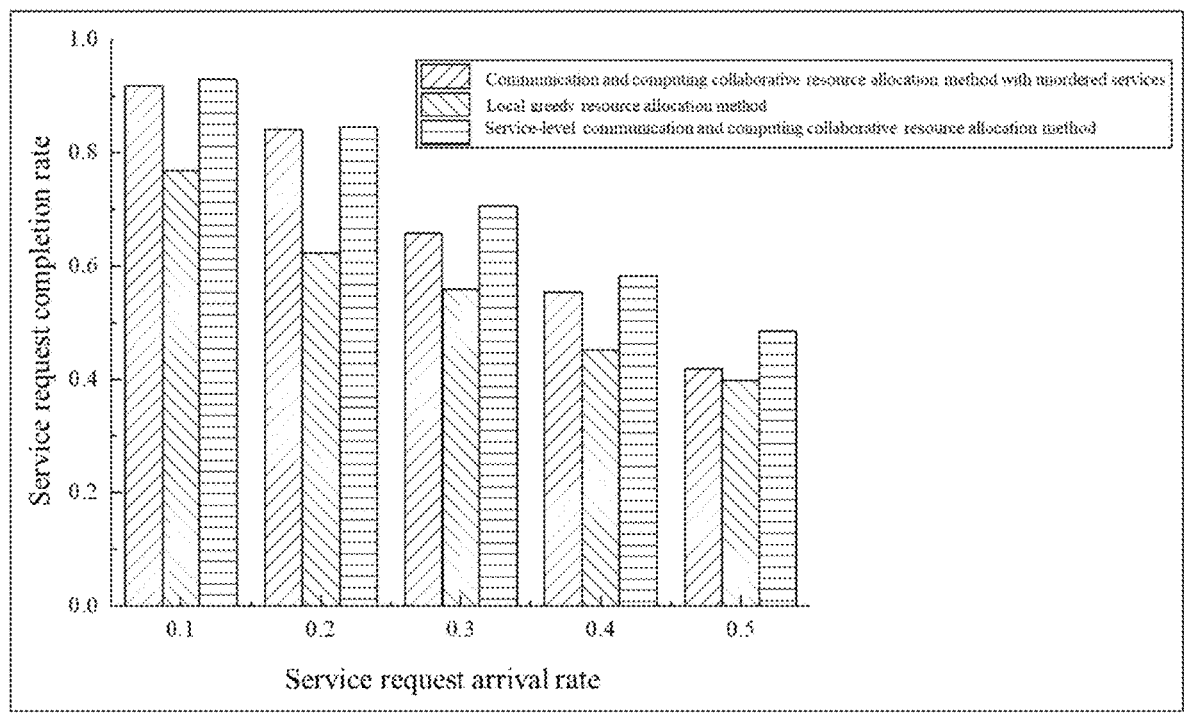
FIG. 4 illustrates a histogram of service request completion rate results under different service request arrival rates of three communication and computing collaborative resource allocation methods in a 66-satellite network scenario according to an embodiment of the disclosure.

In the simulation experiment of the disclosure, the following three communication and computing collaborative resource allocation methods are simulated individually. That is, a communication and computing collaborative resource allocation method with unordered services, a local greedy resource allocation method, and a service-level communication and computing collaborative resource allocation method are respectively simulated to obtain service request completion rates of the three allocation methods under the 66-satellite network scenario for different service request arrival rates. Furthermore, the service request completion rate of the model trained by the service-level communication and computing collaborative resource allocation method designed by the disclosure under the 66-satellite network scenario applied to the 1584-satellite network scenario is obtained. As shown in FIG. 4, FIG. 4 illustrates a histogram of service request completion rate results under different service request arrival rates of the three allocation methods in the 66-satellite network scenario according to an embodiment of the disclosure. It can be seen from FIG. 4 that the service-level communication and computing collaborative resource allocation method designed by the disclosure obtains a higher service request completion rate than the other two comparison methods as the service request arrival rate increases, and when the network has a high service load, the performance gain of the service-level communication and computing collaborative resource allocation method designed by the disclosure is more significant. The reason is that as the arrival rate of service requests increases, the available communication and computing resources of the network are limited, and it is necessary to plan the service order of each service request according to the data volume, delay demands, and destination satellite node of the service request, to reasonably utilize the network communication and computing resources and ensure that more service requests can be effectively served. Please refer to Table 1, which shows the result of the service request completion rate of the model trained in the 66-satellite network scenario that is applied to the 1584-satellite network scenario. It can be seen from Table 1 that the model trained by the service-level communication and computing collaborative resource allocation method designed by the disclosure in the 66-satellite network scenario can be directly applied to the 1584-satellite network scenario, and good service performance can also be obtained in the 1584-satellite network scenario, which means that the service-level communication and computing collaborative resource allocation method designed by the disclosure has good scalability and can effectively cope with LSNs with expanding.

TABLE 1

Service request completion rates of the model trained in the 66-satellite network scenario that is applied to the 1584-satellite network scenario

| Service request arrival rate | 0.1 | 0.2 | 0.3 | 0.5 |
|---|---|---|---|---|
| Service request completion rate | 0.923 | 0.872 | 0.822 | 0.664 |

It should be noted that the three communication and computing collaborative resource allocation methods are as follows.

The first communication and computing collaborative resource allocation method, under the framework of the design concept of the disclosure, removes the service order decision submodule and does not sort the service requests. The remaining parts are the same as the design of the disclosure, and are referred to as the communication and computing collaborative resource allocation method with unordered services.

The second communication and computing collaborative resource allocation method, under the framework of the design concept of the disclosure, gives priority to serving service requests that can reach the destination satellite node in one hop. The remaining parts are the same as the design of the disclosure, and are referred to as the local greedy resource allocation method.

The third communication and computing collaborative resource allocation method uses step S5 of the disclosure to determine the service order of the service requests for the service request sequence arriving at the satellite, and uses step S6 of the disclosure to determine the service strategy of the service request, which is referred to as the service-level communication and computing collaborative resource allocation method.

In summary, the service-level communication and computing collaborative resource allocation device and method for the LSN provided in the disclosure have the following beneficial effects.

1. Compared with an existing resource allocation method, which provides services for service requests in sequence, but ignores impact of the service order on overall service performance, the disclosure designs a resource allocation device with a service order decision submodule. The service request encoder in the service encoding unit is used to encode each to-be-served service request and the available resources in the LSN, so that a relationship between the service requests in the LSN and a relationship between the service requests and the available resources in the LSN are clarified. The service request decoder in the service decoding unit is used to obtain the service sequence of the to-be-served service requests, thereby effectively ensuring the service performance of the LSNs for various service demands.

2. In order to solve the problem that the existing resource allocation methods have high solution complexity and poor scalability, and are difficult to adapt LSNs with continuously expanding network scales, the disclosure designs a service-level communication and computing collaborative resource allocation method based on a reinforcement learning framework. The allocation method, from a perspective, utilizes the processing capability of the pointer network for sequential data and applies the deep reinforcement learning to select the service strategies for the service requests according to the service order, thereby achieving resource allocation that is independent of the network scale. The solution complexity of the designed allocation method is only related to the number of service requests, so as to effectively reduce the complexity of solving collaborative resource allocation strategies of the LSN, and improve the scalability of the method.

It should be noted that, in the disclosure, relational terms such as first, second and the like are only used to distinguish one entity or operation from another entity or operation, and do not necessarily require or imply that there is any such actual relationship or order between these entities or operations. Moreover, a term "include", "comprise" or any other variant is intended to cover non-exclusive inclusion, so that the article or device including a series of elements includes not only those elements, but also other elements that are not explicitly listed. In the absence of more restrictions, the elements defined by the sentence "including a . . . " do not exclude the existence of other identical elements in the article or device including the elements. "Connect" or "connected" and similar words are not limited to physical or mechanical connections, but can include electrical connections, whether direct or indirect. The orientation or position relationship indicated by "up", "down", "left", "right" and the like is based on the orientation or position relationship shown in the drawings, which is only for the convenience of describing the disclosure and simplifying the description, rather than indicating or implying that the device or element referred to must have a specific orientation, be constructed and operated in a specific orientation, and therefore cannot be understood as a limitation of the disclosure.

In the description of the specification, the description with reference to the terms "an embodiment", "some embodiments", "example", "specific example", or "some examples" means that the specific features or characteristics described in conjunction with the embodiment or example are included in at least one embodiment or example of the disclosure. In the specification, the schematic representation of the above terms does not necessarily refer to the same embodiment or example. Moreover, the specific features or characteristics described may be combined in any one or more embodiments or examples in a suitable manner. In addition, those skilled in the art may combine the different embodiments or examples described in the specification.

The above contents are further detailed descriptions of the disclosure in conjunction with the embodiments, and it cannot be determined that the specific implementation of the disclosure is limited to these descriptions. For those skilled in the art, several simple deductions or substitutions can be made without departing from the concept of the disclosure, which should be regarded as falling within the protection scope of the disclosure.

What is claimed is:

1. A service-level communication and computing collaborative resource allocation method for a large-scale satellite network, comprising:
dividing a planning time of the large-scale satellite network with resources to be allocated into T time slots;
analyzing a type of each of to-be-served service requests arriving at the large-scale satellite network at a $t^{th}$ time slot of the T time slots to determine the type of each of the to-be-served service requests; and analyzing, according to the type of each of the to-be-served service requests, attributes of each of the to-be-served service requests to determine the attributes of each of the to-be-served service requests;
calculating, according to the attributes of each of the to-be-served service requests, edge attributes constructed for connecting the to-be-served service requests by using a service priority formula, to generate a service relationship graph corresponding to each type of the to-be-served service requests; and extracting, according to the service relationship graphs, a service demand feature of each of the to-be-served service requests by using a trained service request representation network;
encoding, by using a service request encoder, the service demand feature of each of the to-be-served service requests to generate a network service status of each of the to-be-served service requests; obtaining, according to the network service status of each of the to-be-served service requests, a decoding hidden status of each of the to-be-served service requests by using a service request decoder, calculating, by using a service request served probability formula based on the decoding hidden status of each of the to-be-served service requests, a probability of being served of each of the to-be-served service requests, and determining, according to the probability of being served of each of the to-be-served service requests, a service order of the to-be-served service requests; wherein the service request encoder and the service request decoder are constructed by long short-term memory networks;

calculating, by using a service communication and computing resource demand formula, a demand of each of the to-be-served service requests for communication and computing resources according to the type and the attributes of each of the to-be-served service requests, available resource status information of each satellite node of the large-scale satellite network and the service order of the to-be-served service requests, to generate an available service mode set satisfying each of the to-be-served service requests; and calculating, according to the available service mode set, a probability of being selected of each available service mode in the available service mode set of each of the to-be-served service requests by using an Actor network, and selecting, according to the probability of being selected of each available service mode in the available service mode set of each of the to-be-served service requests, a service strategy of each of the to-be-served service requests;

until the $t^{th}$ time slot, each of the to-be-served service requests selects a service strategy, or available resources in the large-scale satellite network with resources to be allocated are insufficient; and obtaining a service strategy of each of to-be-served service requests within the T time slots;

wherein the trained service request representation network, the service request encoder, the service request decoder, and the Actor network are obtained through training in a reinforcement learning framework with a goal of maximizing a completion rate of the to-be-served service requests, and the service request representation network comprises a graph convolutional network; and wherein the service request served probability formula is expressed as follows:

$p(M^t) = \text{softmax}(U^i);$ $U^i = \{U_j^i | j=1, 2, \ldots, |M^t|\};$ $U_j^i = V^T * \tanh(W_e * N_j + W_d * H_i) - SR_j^i, j \in \{1, 2, \ldots, |M^t|\};$ wherein $p(M^t)$ represents a probability of being served of each of the to-be-served service requests in a to-be-served service request sequence $M^t = \{m|m=1, 2, \ldots, |M^t|\}$ in the $t^{th}$ time slot, softmax(·) represents a normalized exponential function, $U^i$ represents an input value of each of the to-be-served service requests in the normalized exponential function softmax(·) during an $i^{th}$ service, $U_j^i$ represents an input value of a $j^{th}$ to-be-served service request in the normalized exponential function softmax(·) during the $i^{th}$ service, tanh(·) represents a hyperbolic tangent function, $N_j$ represents a network service status of the $j^{th}$ to-be-served service request, $H_i$ represents a decoding hidden status for calculating an $i^{th}$ to-be-served service request, V, $W_e$ and $W_d$ each represent a weight parameter, $SR_j^i$ represents whether the $j^{th}$ to-be-served service request is served during the $i^{th}$ service, * represents a matrix multiplication operation, and T represents a matrix transpose operation.

2. The service-level communication and computing collaborative resource allocation method for the large-scale satellite network as claimed in claim 1, wherein the service priority formula is expressed as follows:

$$P_r(m, n) = \frac{P(n)}{P(m)};$$

wherein $P_r(m, n)$ represents a service priority of a $m^{th}$ to-be-served service request relative to a $n^{th}$ to-be-served service request and is an edge attribute in a direction from an initial node being the $m^{th}$ to-be-served service request to a terminal node being the $n^{th}$ to-be-served service request, P(n) represents a service priority of the $n^{th}$ to-be-served service request, and P(m) represents a service priority of the $m^{th}$ to-be-served service request.

3. The service-level communication and computing collaborative resource allocative method for the large-scale satellite network as claimed in claim 2, wherein the service priority P(m) of the $m^{th}$ to-be-served service requests is as follows:

$P(m) = \Sigma_{f \in F} W_f(m) \cdot V_f(m);$ wherein $F = \{f|f=1, 2, \ldots, |F|\}$ represents an attribute set for computing the service priority of the $m^{th}$ to-be-served service requests, |·| represents an operation for solving a number of elements in the attribute set, $w_f(m)$ represents a weight of a $f^{th}$ attribute of the $m^{th}$ to-be-served service request, and $v_f(m)$ represents a quantized value of the $f^{th}$ attribute of the $m^{th}$ to-be-served service request.

4. The service-level communication and computing collaborative resource allocation method for the large-scale satellite network as claimed in claim 1, wherein the service communication and computing resource demand formula is expressed as follows:

$C_{req}(m) = C_{pc} \cdot \text{data}(m) \cdot \chi(m);$ $R_{req}(m) = (1-\chi(m)) \cdot \text{data}(m) + \chi(m) \cdot C_{ratio} \cdot \text{data}(m);$ wherein $C_{req}(m)$ represents a demand of computing resources for a $m^{th}$ to-be-served service request, $C_{pc}$ represents a computing cycle required for per-bit data, data(m) represents a data volume of the $m^{th}$ to-be-served service request, $\chi(m)$ represents whether data process is required to be performed on the $m^{th}$ to-be-served service request, $R_{req}(m)$ represents a demand of communication resources for the $m^{th}$ to-be-served service request, and $C_{ratio}$ represents a data compression ratio of the to-be-served service requests.

* * * * *